(12) United States Patent
Ayel (10) Patent No.: US 10,302,280 B2
(45) Date of Patent: May 28, 2019

(54) LOW WASTE, MULTI-LIGHT, MULTI-SIDE LED LAMP

(71) Applicant: Arash Ayel, Tehran (IR)

(72) Inventor: Arash Ayel, Tehran (IR)

( * ) Notice: Subject to any disclaimer, the term of this patent is extended or adjusted under 35 U.S.C. 154(b) by 0 days.

(21) Appl. No.: 15/653,559

(22) Filed: Jul. 19, 2017

(65) Prior Publication Data

US 2019/0024875 A1   Jan. 24, 2019

(51) Int. Cl.
| | |
|---|---|
| *F21K 9/23* | (2016.01) |
| *F21K 9/235* | (2016.01) |
| *F21K 9/237* | (2016.01) |
| *F21K 9/238* | (2016.01) |
| *F21V 15/01* | (2006.01) |
| *F21V 19/00* | (2006.01) |
| *F21V 23/00* | (2015.01) |
| *F21V 23/04* | (2006.01) |
| *H05B 37/02* | (2006.01) |
| *F21Y 107/40* | (2016.01) |
| *F21Y 115/10* | (2016.01) |

(52) U.S. Cl.
CPC ............... *F21V 15/01* (2013.01); *F21K 9/23* (2016.08); *F21K 9/235* (2016.08); *F21K 9/237* (2016.08); *F21K 9/238* (2016.08); *F21V 19/001* (2013.01); *H05B 37/02* (2013.01); *F21V 23/003* (2013.01); *F21V 23/04* (2013.01); *F21Y 2107/40* (2016.08); *F21Y 2115/10* (2016.08)

(58) Field of Classification Search
CPC ..... F21Y 2107/40; F21V 23/003; F21V 23/04
See application file for complete search history.

(56) References Cited

U.S. PATENT DOCUMENTS

| | | | | |
|---|---|---|---|---|
| 2003/0021113 | A1* | 1/2003 | Begemann | F21V 3/00 362/231 |
| 2011/0013413 | A1* | 1/2011 | Yang | F21K 9/232 362/545 |
| 2012/0127722 | A1* | 5/2012 | Moeck | F21V 29/004 362/249.03 |
| 2012/0218737 | A1* | 8/2012 | Komatsu | F21V 3/00 362/84 |
| 2014/0198508 | A1* | 7/2014 | Perng | F21K 9/232 362/311.02 |
| 2014/0292192 | A1* | 10/2014 | Rodinger | H05B 33/0806 315/32 |
| 2015/0300579 | A1* | 10/2015 | Wang | F21V 29/506 362/249.02 |
| 2016/0040831 | A1* | 2/2016 | Lin | F21K 9/23 315/51 |
| 2017/0055325 | A1* | 2/2017 | Rodinger | H05B 33/0803 |

* cited by examiner

*Primary Examiner* — Alexander K Garlen
(74) *Attorney, Agent, or Firm* — Azadeh Saidi (57) ABSTRACT

A "low waste multi light-multi side LED lamp" based on optimum usage of LED component properties, improving limited view angel of LED lamps without usage of diffuser bulb (which reduces the lamp lighting intensity itself at least 10-20 percent). The LED having an increased attachable surface with more low power and high efficiency (0.2 w-0.5 w).

8 Claims, 8 Drawing Sheets

LOW WASTE, MULTI-LIGHT, MULTI-SIDE LED LAMP

BACKGROUND OF THE INVENTION

Energy consumption reduction in developed and developing countries is a very important issue in industrial applications and household equipment. In lighting industry, the use of low power consumption lamps is inevitable. Also low power consumption lamps are critical in environmental protection and reduction of harmful effects of products; therefore people are encouraged to use products more compatible with sustainable development patterns. Thus due to LED's benefits including but not limited to high efficiency, no harmful radiation and less recycling contamination; its use has increased in the lighting industry.

Till now the design of an LED lamp is based on the traditional incandescent lamps which had been designed in $19^{th}$ century, including a lamp base, a lamp body for placing a power board inside it, a heat dissipation element and an LED board. A diffuser bulb having a Spherical or candle shape design has also improved the view angel of the LED lamp wider and gives it a nicer shapes overall. However the question that comes to mind is whether this is enough and is there any other way of optimizing an LED?

Despite having the higher efficiency and lower harmful effects in radiation and recycling for LED Lighting, this product suffers from limited viewing angle and sensitivity to heat generation and increasing temperature in semiconductors.

However by using a "Diffuser bulb" in the current LED lamps, the limitations above has been partially solved, but on the other hand the light intensity of the lamp and its performance is reduced. In order to reduce the rise in temperature of the LED lamps, use of a Heat Sink is inevitable, this will result in a larger bulb size. All these short comings resulted in the new LED lamp designed and explained as follows.

SUMMARY OF THE INVENTION

The main idea for the invention of a "Low waste, Multi-sided (Vase shaped) LED lamp" is based on a new geometrical design which two important principles was considered:
1) Elimination of lighting angel restrictions; therefore relying on the appropriate angels between lateral surfaces of this new geometrical shape and
2) Increasing the LED mountable surface area in comparison to lamps with similar size and dimensions.

Due to increasing the heat releasable surface area on the lamp and decreasing the power consumption of LED components, the usage of heat sinks is eliminated or reduced in this design. Also more space is created in the lamp core in order to place the power circuit which has a larger internal dimmer; therefore the light intensity will be reduced which causes the power consumption reduction.

Figure 7:
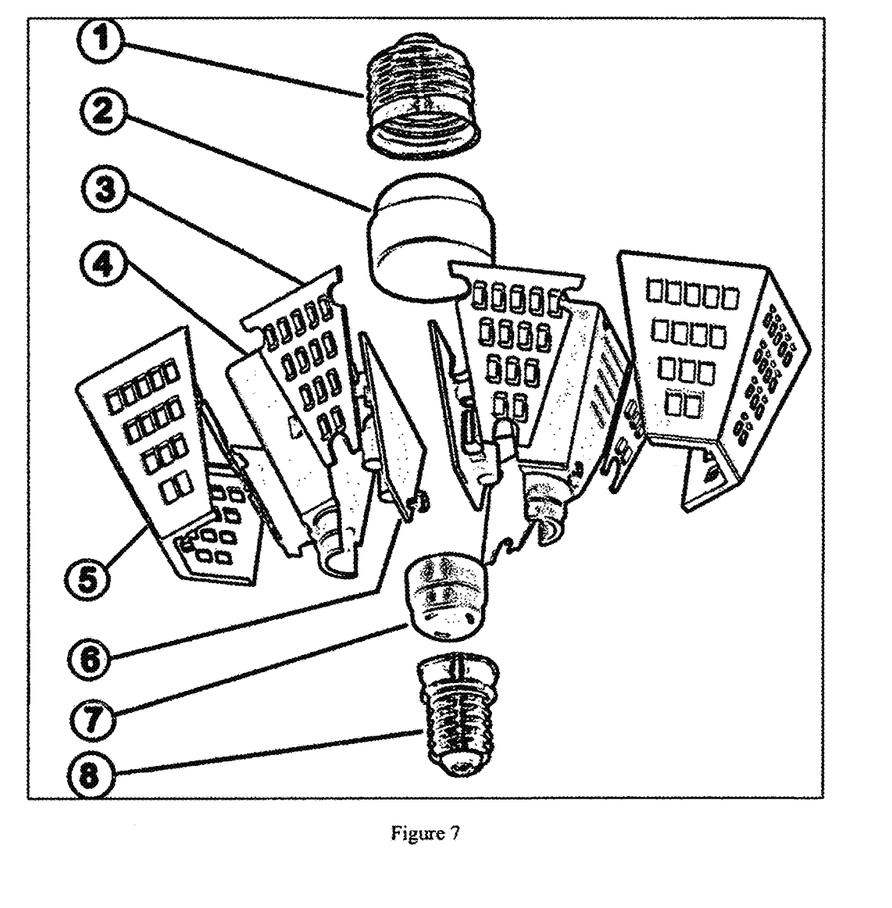
FIG. 7: Is a lamp detailed elements consisting of: (1) E27 base socket (2) E27 cap when the socket is not installed (3) LED installed lateral boards (4) The ballast container cover (5) The LED board plastic cover (6) The power driver board (7) E14 replacement cap when it's socket is not installed (8) E14 base socket
Figure 8:
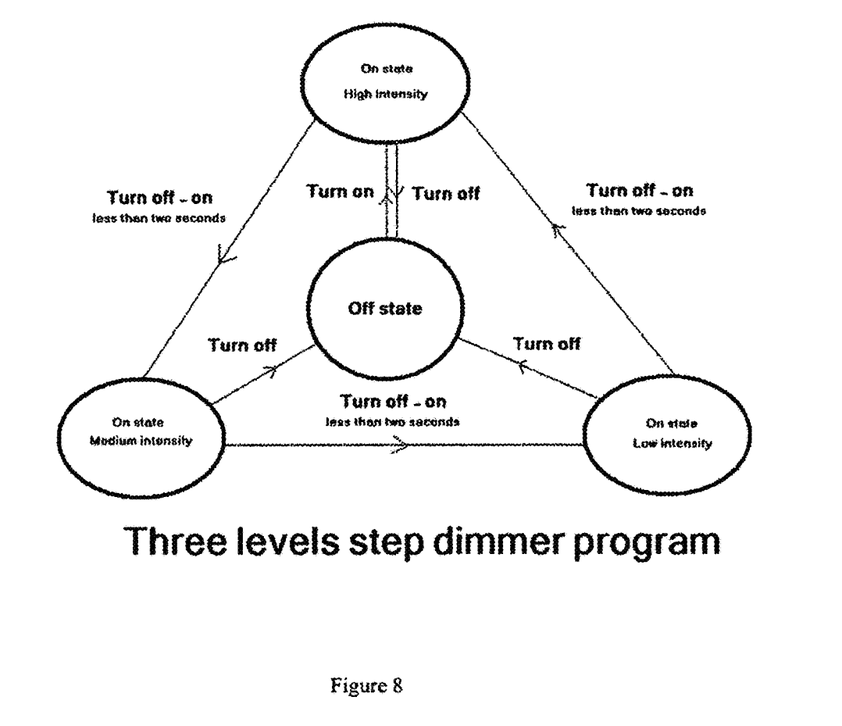
FIG. 8: Is a Diagram of step dimmer program used by turning ON-OFF of the lamp

The new geometrical shape of this invented lamp is an upside down partial pyramid in which LED components are mounted on the lateral surfaces instead of the base and both small and large bases can be dedicated to base socket installing, also the lamp driver can be placed inside the pyramid (FIG. 7).

Figure 1:
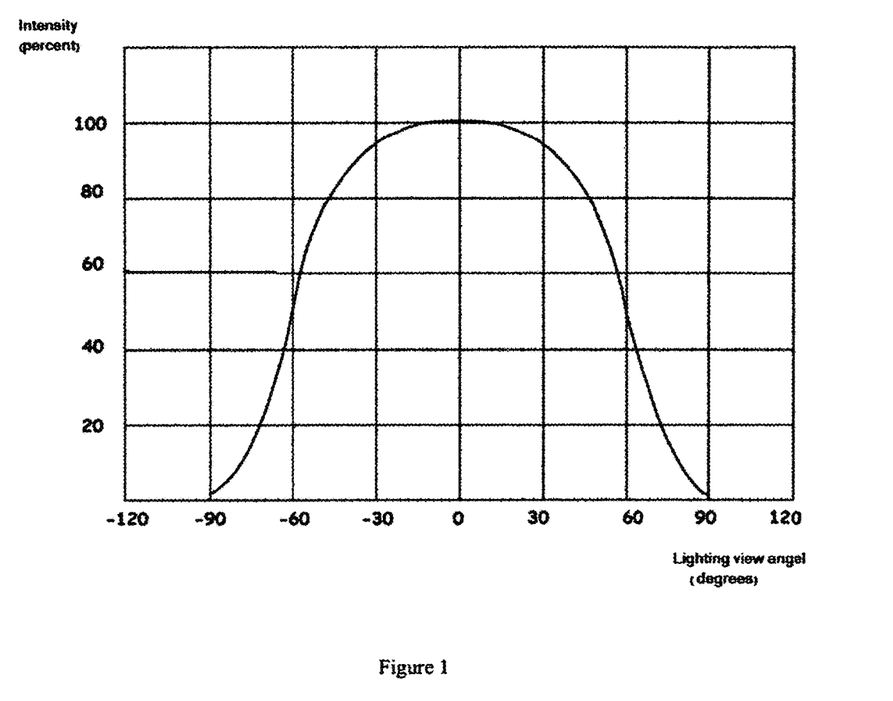
FIG. 1: Is an oval LED lighting diagram (60 degrees viewing angle direction)
Figure 2:
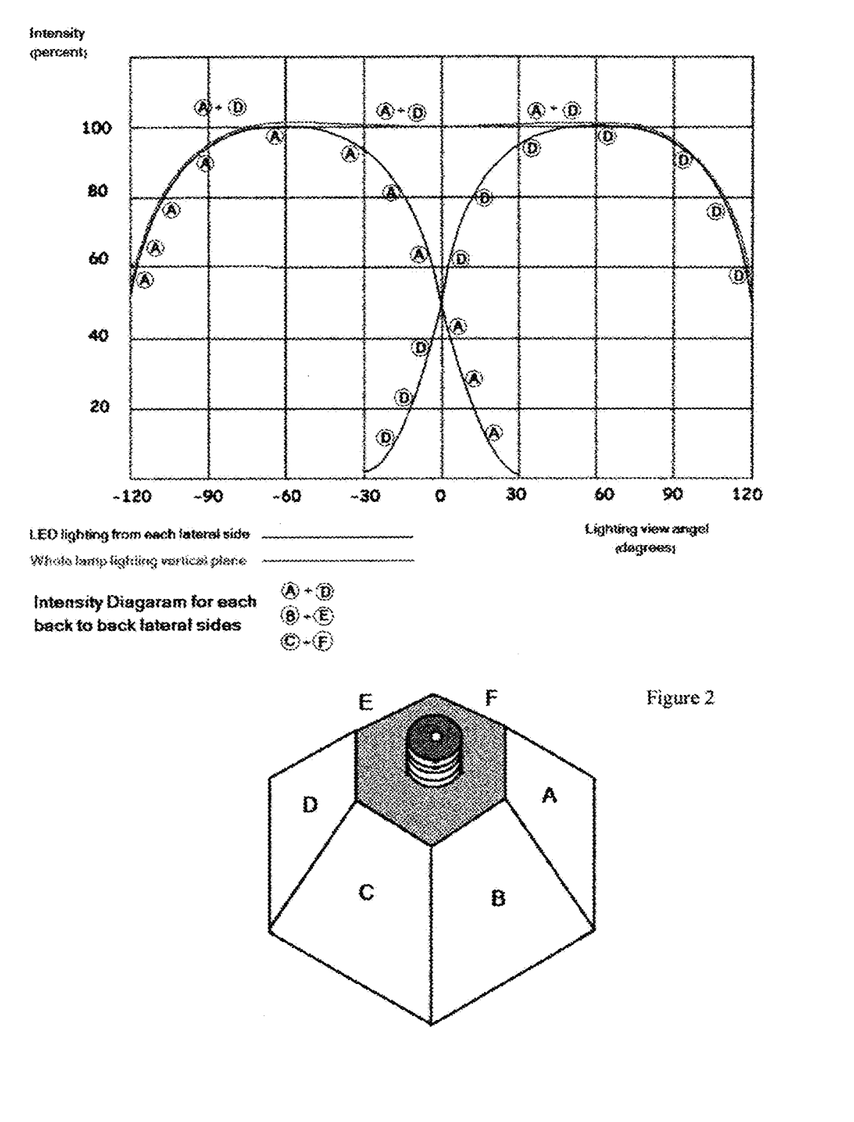
FIG. 2: Is a lamp lighting diagram with 6 lateral sides on horizontal plane.
Figure 3:
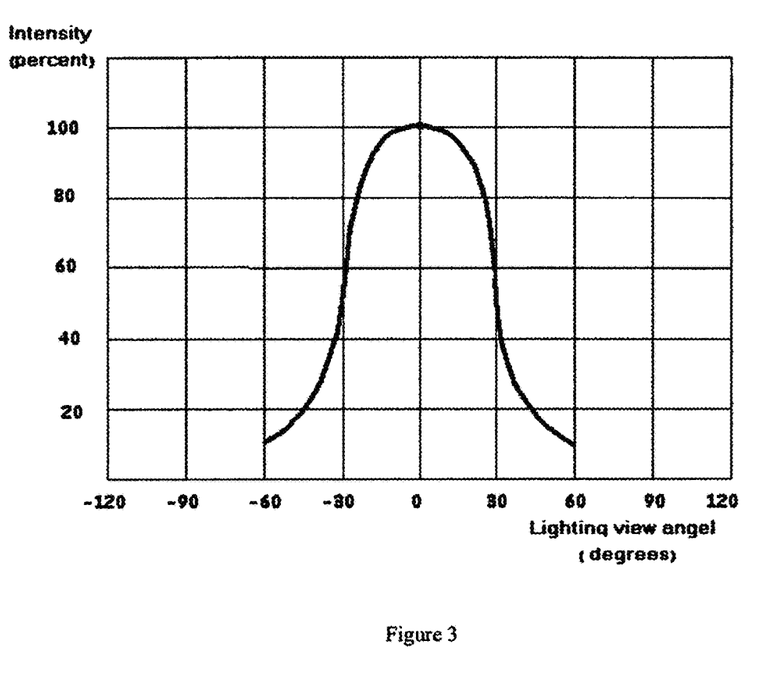
FIG. 3: Is an oval LED lighting diagram (120 degrees viewing angle direction) or SMD LED lighting diagram
Figure 4:
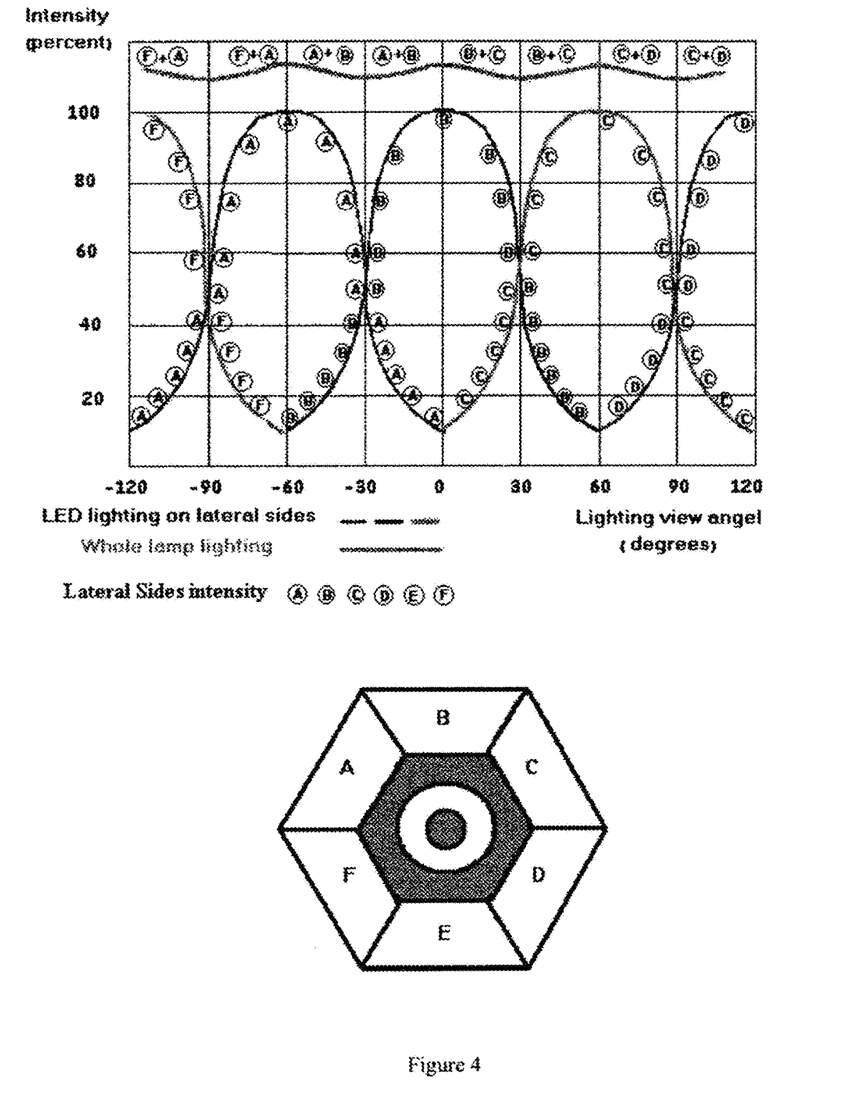
FIG. 4: Is a lamp lighting diagram on vertical plane

Considering that the LED components as the light source in lamps are encountering with restrictions in lighting angels between 60 to 120 degrees (FIG. 1 & FIG. 3), thus this new shape is designed as a hexagonal based pyramid with six lateral surfaces for LED mounting (other multi-sided design and more or less sides can be used), (suitable for the minimum 60 degrees LED component lighting) which covers 6×60=360 degrees uniform lighting all around the lamp by its created overlaps (FIG. 2). Now if the slope of lateral surfaces is considered 30 degrees, by considering 120 degrees of LED component lighting angles, the total lamp lighting angle reaches to 240 degrees at minimum (FIG. 4).

The use of the pyramid lateral surfaces instead of its base for mounting of the light emitting components raises the LED mountable area in the lamp and thus provides possible applying of more low power LEDs which results in more efficiency and less power wasting beside the ease of heat dissipating due to area expansion.

Figure 5:
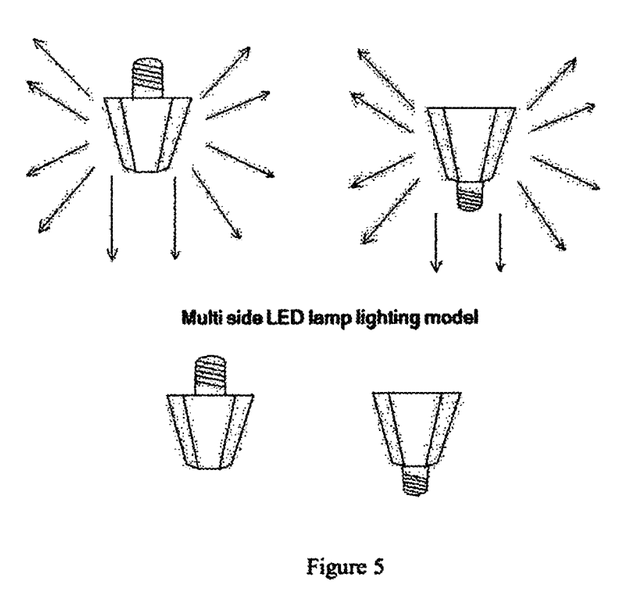
FIG. 5: Is a lamp lighting model with E14 & E27 base sockets
Figure 6:
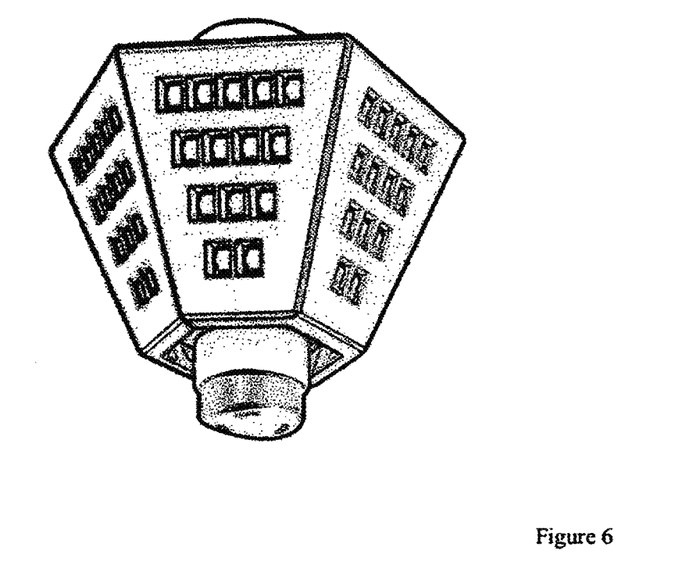
FIG. 6: Is a lamp 3D model and geometrical shape

It is possible to install base socket on both small base and large base of this partial pyramid shape lamp depending to its appliance. Since the candle shaped lamps with E14 base socket are usually installed upward in chandeliers, the installation place for this socket is considered on the small base instead of the E27 socket which is installed on the large base (FIG. 5).

Hence there is no need for a diffuser bulb in order to fix up limited lighting angle problem in this new shaped Led lamp, thus the higher lighting efficiency is appeared through diffuser bulb removal and also there is no need or less need for using heat sink components due to applying low or medium power LEDs which causes a relative size and volume reduction of the lamp.

The step dimmer included inside the driver of lamp (which is controlled by On-Off pulses of the main switch in intervals between 0.5 sec to 2 sec) causes to reduce driving current of LEDs and thus energy consuming is decreased while there is not any need to maximum lighting. The operation of this internal dimmer is such defined that when in first turning on, the lamp illuminates by maximum current and by one time turning OFF and then ON the main switch , the lamp intensity is reduced to average level and by repeating this , the lamp intensity is) reduced to low level . Repeating this turning OFF then ON action pushes the lamp intensity to the first maximum level (Diagram-1).

DETAILED DESCRIPTION

By using of wide view angel LEDs like oval types which create lighting angels of 60-120 degrees in two vertical and horizontal directions or using of SMD LEDs with 120 degree lighting angel attached on pyramid lateral surfaces with 30 degrees slop can provide 90 degrees lighting angle under the lamp (which causes remaining no dark spot under the lamp).

In the case which oval LEDs with 60 degrees lighting in horizontal direction are used we are forced to design six sided pyramid as the lamp shape to provide 360 degrees uniform lighting around the lamp, but if SMD LEDs with wider view angels are used, we can design four sided or five sided pyramid shapes to provide 360 lighting degrees around the lamp. But it is not recommended because of the reduction of light uniformity and easing of the corner angels to (90-108 degrees) which make the lamp body more damageable.

Increasing the lateral sides of pyramid to seven, eight or more make no conflicts to lamp lighting operation but only increase the cost of production. Thus the six sided pyramid shape seems to be the optimum solution for this invention.

The larger the surface of pyramid lateral sides of this invented lamp in comparison to the conventional lamps which uses base surface for installing of the LEDs enables us to install relatively more LEDs, specially low power or mid power ones which increases the lighting efficiency of the lamp meanwhile the more heat dissipation is possible due to the larger surface for heat distribution.

Since there is no need for a diffuser bulb in this lamp due to geometrical shape; which makes this lamp to have enough strength and pretty beside the ability of natural distribution of light, 10-20 percent of light intensity reduction is eliminated and it raises the lamp efficiency and better heat dissipation.

Since the vertical lighting angle of the lamp is designed to be 240 degrees downside, the base sockets can be installed on both small and big bases of the pyramid lamp due to different applications, which due to usual cases E27 base sockets are installed on the big base and E14 base sockets can be installed on the small base of the lamp.

Considering that the lighting intensity of LED lamps can be controlled and dimmed by controlling its driver current, thus the designing of internal dimming circuit in such a way that makes the user to apply it without any change in previously installed sockets and circuits is an important property and can play a great role in the lamp energy saving.

By this idea, the designing of "Stepping Dimmer" which controls the lamp lighting intensity in each "On-Off" actions of the main switch, puts ahead a new application idea. This idea causes this switching action be considered as a control command despite the conventional imagination which makes the lamps to be burnt.

In this way when the lamp switch is turned on, it emits the maximum light intensity and by each time on-offing the switch, the intensity reduces on step to medium and then minimum and by repeating this, it returns to the maximum intensity. This loop can be considered to have 3 or 4 stages (High-Medium-Low-very Low) and by using different levels of intensity of this lamp in different hours in a day and night, the maximum energy saving is obtained and the lamp lifetime is also increased.

The geometrical shape of the lamp which is designed as an upside down partial pyramid in which LED components are mounted on the lateral surfaces and if the slope of lateral surfaces be at least 30 degrees and LED components of 120 degrees lighting angle are used thus the lamp lighting angle reaches to 240 degrees on the vertical plane downside the lamp without using of any diffuser bulb. Of course by changing of lateral surfaces slope between 15 to 60 degrees we can optimize the lighting angle of the lamp if the LED components with different viewing angles (more or less than 120 degrees) are used.

Also for confirming to have uniform 360 degrees lighting of the lamp on the horizontal plane all around the lamp, the shape of six sided pyramid is considered as a basic shape of the lamp (by considering the 60 degrees viewing angle of LED components) but the partial pyramid shape can be changed to four-side or five-side if the LEDs viewing angles are more than 60 degrees or would be changed to seven-side, eight-side or more sides up to reaching to partial cone (Frustum) if the LED components viewing angles are less than 60 degrees.

The shape of Ballast compartment of the lamp the subject of this invention which is placed inside the pyramid volume and two base sockets can be installed on both sides simultaneously or one of them at the same time. The required power for the LEDs on boards can be reached by the side sluts on the compartment.

The modular connection ability of two or more lamps in series via the second base point connection on the ballast compartment allows more lighting intensity capabilities.

The lamp driver current control method as by steps through turning "On and Off" in rapid succession of power key makes possible the dimming action of the lamp .As for optimum case it consists of three stages (High intensity-Medium intensity-Low intensity) but due to different applications it can be set to have between 2-7 levels of intensity.

Thus, the low waste, multi-side, multi-light LED lamp uses of internal dimmer which can be controlled by main ON-Off switch in several steps.

The invention claimed is:

1. A multisided LED lamp comprising:
   a power driver board, a lamp driver, and a step dimmer, the lamp driver and step dimmer attached to said power driver board;
   a ballast container divided along a vertical axis of said lamp into a first container section and a second container section, wherein each of said first and second container sections comprise a plurality of parallel venting slits, said first and second container sections being attached together forming a geometric shape which covers said power driver board;
   a plurality of lateral boards, wherein a plurality of LED devices are mounted on each of said lateral boards in a predesigned interval and distance in parallel rows covering an outside surface of each of said lateral boards; and
   a cover divided along the vertical axis of said lamp into a first cover section and a second cover section, wherein each of said first and second cover sections comprise a plurality of openings corresponding to the plurality of LED devices, said first and second cover sections being attached together forming a geometric shape corresponding to the geometric shape of the ballast container and covering the plurality of lateral boards;
   a first base socket located on a first end of said lamp and optionally having a first cap thereon, a second base socket located on an opposite end of said lamp and optionally having a second cap thereon, said first and second base sockets arranged along said vertical axis and attached to both of said first and second container sections, wherein one of said top end and said bottom end is larger than the other.

2. The multisided LED lamp of claim 1, wherein said first base socket corresponds to an E14 size socket and said second base socket corresponds to an E27 size socket, said first end having a smaller surface area than said opposite end.

3. The multisided LED lamp of claim 1, wherein the geometric shape of said ballast container and of said cover is partial pyramidal.

4. The multisided LED lamp of claim 1, wherein the plurality of lateral boards is six lateral boards each having a lateral slope of at least 60 degrees with respect to the vertical axis, and said lamp has a hexagonal cross section about the vertical axis.

5. The multisided LED lamp of claim 1, wherein said LEDs are SMD-LEDs, and the plurality of lateral boards is four or five lateral boards each having a lateral slope of 30 degrees with respect to the vertical axis.

6. The multisided LED lamp of claim 1, wherein said lamp is turned on and off by a main switch, said step dimmer is initiated by turning the lamp off and on with the switch within a time interval of at least 0.5 seconds and less than 2 seconds.

7. The multisided LED lamp of claim 6, wherein when said lamp is turned on for a first time, said lamp illuminates to and remains at a maximum level unless said main switch is turned off and back on within the time interval, in which said lamp illuminates to and remains at a medium intensity level unless said main switch is turned off and back on again within the time interval, in which said lamp illuminates to and remains at a low intensity level unless said main switch is turned off and back on again within the time interval, in which said lamp illuminates to and remains again at a maximum level; wherein if at any of said maximum, medium and low intensity levels said lamp is not turned off and back on within the time interval, said intensity level remains the same.

8. The multisided LED lamp of claim 7, wherein said high, medium, and low intensity levels comprise between two and seven different intensity levels.

* * * * *